United States Patent
Uozu et al.

(10) Patent No.: US 6,654,173 B1
(45) Date of Patent: Nov. 25, 2003

(54) LENS ARRAY, IMAGE SENSOR, INFORMATION PROCESSOR AND INFORMATION PROCESSING SYSTEM COMPRISING THE IMAGE SENSOR

(75) Inventors: Yoshihiro Uozu, Otake (JP); Norifumi Hirota, Otake (JP); Toshinori Sumi, Iwakuni (JP); Teruta Ishimaru, Yokohama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 49 days.

(21) Appl. No.: 10/111,534

(22) PCT Filed: Oct. 27, 2000

(86) PCT No.: PCT/JP00/07542

§ 371 (c)(1),
(2), (4) Date: Apr. 25, 2002

(87) PCT Pub. No.: WO01/31368

PCT Pub. Date: May 3, 2001

(30) Foreign Application Priority Data

Oct. 27, 1999 (JP) .......................... 11-306060

(51) Int. Cl.$^7$ .............................................. G02B 27/10
(52) U.S. Cl. ........................ 359/619; 359/623; 359/626
(58) Field of Search ................................. 359/619, 623, 359/626, 654, 653, 652, 624, 618; 358/509, 512; 385/124

(56) References Cited

U.S. PATENT DOCUMENTS

| | | | | |
|---|---|---|---|---|
| 4,571,022 A | * | 2/1986 | Lama et al. | 385/116 |
| 4,791,493 A | * | 12/1988 | Ogura et al. | 358/475 |
| 4,971,423 A | * | 11/1990 | Nakata et al. | 385/124 |
| 4,996,606 A | * | 2/1991 | Kawai et al. | 358/475 |
| 5,233,442 A | * | 8/1993 | Kawai et al. | 358/482 |
| 5,959,783 A | | 9/1999 | Kittaka et al. | 359/654 |
| 6,031,668 A | | 2/2000 | Toyama et al. | 359/654 |
| 6,088,164 A | | 7/2000 | Fukasawa | 359/619 |
| 6,115,187 A | * | 9/2000 | Tabata et al. | 359/654 |

FOREIGN PATENT DOCUMENTS

| | | |
|---|---|---|
| CA | 2297234 | 7/2000 |
| CN | 1215847 A | 5/1999 |
| CN | 1263288 A | 8/2000 |
| EP | 0 878 310 A1 | 11/1998 |
| EP | 0 887 664 A2 | 12/1998 |
| EP | 0 926 513 A2 | 6/1999 |
| JP | 47-816 | 1/1972 |

(List continued on next page.)

*Primary Examiner*—Georgia Epps
*Assistant Examiner*—Brandi N Thomas
(74) *Attorney, Agent, or Firm*—Morgan, Lewis & Bockius LLP (57) ABSTRACT

An object of this invention is to provide a lens array in which the amount of light reaching the image forming surface is large and the variation in the amount of light is small. In order to achieve this object, the lens array comprises cylindrical graded index lenses of radius $r_0$ wherein the refractive index continuously decreases from the center of the lens toward the periphery, said cylindrical graded index lenses are arranged in one line or plural lines with array pitch 2R, if R is $R \geq r_0 \geq 0.8R$ and if the refractive index profile of each graded index lens is approximated by $n(r)^2 = n_0^2 \{1-(g \cdot r)^2\}$, the overlapping degree m defined by $m = X_0/2R$ satisfies $1.05 \leq m \leq 1.2$, wherein, said r is the distance from the optical axis, $n(r)$ is refractive index at the distance r from the optical axis, $n_0$ is the refractive index at the center, g is the refractive index profile constant, $X_0$ is the radius of the field of view $(X_0 = r_1 \cos(Z_0 \pi/P))$, $r_1$ is the effective radius of the graded index lens, $Z_0$ is the length of the graded index lenses, and P is the period length of the graded index lenses namely $P = 2\pi/g$.

22 Claims, 5 Drawing Sheets

FOREIGN PATENT DOCUMENTS

| | | |
|---|---|---|
| JP | 47-28059 | 7/1972 |
| JP | 10-309826 | 11/1998 |
| JP | 11-14803 | 1/1999 |
| JP | 11-64605 | 3/1999 |
| JP | 11-136439 | 5/1999 |
| JP | 11-183798 | 7/1999 |
| JP | 11-231212 | 8/1999 |
| JP | 2000-221442 | 8/2000 |
| KR | 1999-0037485 | 5/1999 |
| TW | 392080 | 6/2000 |

* cited by examiner

700: IMAGE SENSOR
701: FEED ROLLER
702: SEPARATION PIECE
704: RECORDING HEAD
705: PLATEN ROLLER
706: OPERATION PANEL
707: SYSTEM CONTROL BOARD
708: POWER SUPPLY

LENS ARRAY, IMAGE SENSOR, INFORMATION PROCESSOR AND INFORMATION PROCESSING SYSTEM COMPRISING THE IMAGE SENSOR

TECHNICAL FIELD

This invention relates to a lens array, an image sensor, and an information processor comprising the image sensor and an information processing system comprising the image sensor.

This application is based on Japanese Patent Application, No. Hei 11-306060 filed in Japan, the content of which is incorporated herein by reference.

BACKGROUND ART

Heretofore, an image sensor unified with a lighting device to light a document, a lens to form an image of the reflected light which is reflected by the document, and which has the information of the document, and a sensor to convert the reflected light image formed by the lens into electrical signals is used as the reading device in a facsimile device, a scanner device, or other information processor. Lenses may be divided into two basic kinds: reduction type lens and equal size type lens. The reduction type lens forms an image which has a size reduced relative to the size of the object, and which is formed by the reflected light from a document. The equal size type lens forms an image which has a size which is equal to an object, and which is formed b y the reflected light from a document.

Generally, the latter equal size type lens is often used as the shape of a so called lens array that has many lens elements arranged in line of a length equivalent to the width of a document.

Recently, the reduction type lens which requires a long optical path length is not used very much because of the desire to miniaturize information processors such as facsimile devices and scanner devices. Furthermore, the lens array which comprises the equal size type lens in which the optical path length is short is common.

The cylindrical lens which has a continuous refractive index profile inside is used as the equal size type lens. A lens, made of glass which has a continuous refractive index profile inside, was already proposed in Japanese Examined Patent Application, Second Publication No. Sho 47-816. Furthermore, a lens made of plastic which has a continuous refractive index profile inside was proposed in Japanese Examined Patent Application, Second Publication No. Sho 47-28059. Subsequently, the lens made of glass by various techniques and a lens made of plastic by various techniques were proposed. Generally both end surfaces of these graded index lenses are polished to mirror-finished surfaces which are vertical to the center axes of these lenses, and which are parallel mutually. Furthermore, these graded index lenses are used singly and as a micro-lens. Furthermore, the lens array in which a plurality of these lenses are arranged and adhered and unified is widely used as a part of line sensors used in copying machines, facsimile machines, scanners, and so on. Furthermore, the lens array is widely used as the writing devices used in LED printers and so on.

In addition, the range in which one lens forms an image of a size equal to that of an object is a circle of radius $X_0$ (radius of the field of view). The amount of light is the greatest at the optical axis and decreases with distance from the optical axis. The lens array causes a variation in the amount of light in t he length direction of the array with a period of the array pitch (2R) of the lens. The variation in the amount of light depends on the overlapping degree m defined by $m=X_0/2R$.

A lens array designed so that the overlapping degree m satisfies $1.61 \leq m \leq 1.80$ or $2.06 \leq m \leq 2.50$ to make the variation in the amount of light small is disclosed in Japanese Unexamined Patent Application, First Publication No. Hei 11-64605.

However, there is a problem in that the amount of light reaching a light receiving sensor is reduced in this lens array because the overlapping degree m thereof is large and the radius $X_0$ of the field of view is large when an image sensor is composed by using this lens array. Therefore, the lens for a color scanner of the type whose chromatic aberration is small may be used in this lens array. However, generally an aperture angle is 15 degrees or less with this lens, that is, it is small. Therefore, the amount of light which can be taken in is ½ or less with this lens in comparison with a lens with an aperture angle of about 20 degrees typically used for a monochrome image sensor. Therefore, when this image sensor is used, it is necessary to lower the reading speed in accordance with the ability of the light receiving sensor. Furthermore, according to this, it becomes easy to be influenced by noise factors such as outside light.

Furthermore, the difference of conjugate length TC between each wavelength of RGB increases when the overlapping degree m is enlarged that when there is some chromatic aberration in the lens. Then, color blurring appears in the color image sensor comprising this lens. Furthermore, the resolution of the color image sensor comprising this lens is low.

DISCLOSURE OF INVENTION

An object of this invention is to provide a lens array in which the amount of light reaching the image forming surface is large and the variation in the amount of light is small. Furthermore, an object of this invention is to provide an image sensor in which reading speed is high, and an information processor comprising it. Reading speed of the image sensor is high even when a lens whose aperture angle is small and whose chromatic aberration is small, that the amount of light which can be taken in is small is used, by using the lens array in which the amount of light reaching the light receiving sensor is large. Furthermore, another object of this invention is to provide an image sensor whose resolution is high even if a lens with some chromatic aberration is used, and an information processor comprising it.

A point of this invention is that the lens array comprises cylindrical graded index lenses of radius $r_0$ wherein the refractive index continuously decreases from the center of the lens toward the periphery, said cylindrical graded index lenses are arranged in one line or plural lines with array pitch 2R, if R is $R \geq r_0 \geq 0.8R$ and if the refractive index profile of each graded index lens is approximated by $n(r)^2 = n_0^2\{1-(g \cdot r)^2\}$, the overlapping degree m defined by $m=X_0/2R$ satisfies $1.05 \leq m \leq 1.2$, wherein, said r is the distance from the optical axis, n(r) is the refractive index at the distance r from the optical axis, $n_0$ is the refractive index at the center, g is the refractive index profile constant, $X_0$ is the radius of the field of view ($X_0 = -r_1 \cos(Z_0/P)$, $r_1$ is the effective radius of the graded index lens, $Z_0$ is the length of the graded index lenses, and P is the period length of the graded index lenses namely $P=2\pi/g$.

Furthermore, a point of this invention is that in the lens array the aperture angle of said graded index lens is 15 degrees or less.

Furthermore, a point of this invention is that in the lens array R is $R > r_0 \geq 0.8R$.

Furthermore, a point of this invention is that in the lens array the overlapping degree m is $1.1 \leq m \leq 1.2$.

Furthermore, a point of this invention is that in the lens array said graded index lens is made of plastic.

Furthermore, a point of this invention is that in the lens array said graded index lens is made of glass.

Furthermore, a point of this invention is that the image sensor comprises a lighting device which lights a document, said lens array which makes reflected light from a document form an image, and an opto-electronic conversion device which receives the light of the image formed by said graded index lens.

Furthermore, a point of this invention is that the image sensor comprises the lens array wherein an interval Lm between the end surface of one side of said graded index lens and the document satisfies $0.95 \cdot L_0 \leq Lm \leq 1.05 \cdot L_0$ with the air layer conversion, and wherein an interval Ls between the end surface of the other side of said graded index lens and the sensor satisfies $0.95 \cdot L_0 \leq Ls \leq 1.05 \cdot L_0$ with the air layer conversion, wherein said $L_0$ is $L_0 = -(1/n_0 g) \cdot \tan(Z_0 \pi/P)$.

Furthermore, a point of this invention is that in the image sensor the illuminant of said lighting device is an LED.

Furthermore, a point of this invention is that in the image sensor the illuminant of said lighting device comprises plural LEDs emitting wavelengths which are different from each other.

Furthermore, a point of this invention is that in the image sensor the illuminant of said lighting device comprises plural LEDs emitting wavelengths of three colors that are equivalent to blue, green, and red, and that are different from each other.

Furthermore, a point of this invention is that the information processor comprises said image sensor and a processing means which processes the image information inputted from said image sensor.

Furthermore, a point of this invention is that the information processor comprises said image sensor, a means which changes the relative position between a document and the image sensor, an image forming means which forms an image from the image information read with said image sensor, and a control means which controls from input of a document to output.

Furthermore, a point of this invention is that the in formation processor comprises said image sensor, an analog signal processing means which processes an analog signal from said image sensor, a converting means which converts said analog signal into a digital signal, a digital signal processing means which processes said digital signal from said converting means, and an interface means which connects with the outside apparatus.

Furthermore, a point of this invention is that the information processing system comprises said information processor and a computer connected with said information processor, wherein said interface means built in said information processor and the second interface means built in said computer are connected to each other, and wherein a digital signal is transmitted and received through these interface means.

The variation in the amount of light of the lens array of the image sensor of this invention is small, and the amount of light thereof is high, and the apparent chromatic aberration thereof is small. Therefore, there is a little blurring due to chromatic aberration, and reading with vivid high resolution in which the variation in the amount of light is small can be realized.

Furthermore, an information processor and an information processing system of this invention can process high quality images read by the image sensor.

BEST MODE FOR CARRYING OUT THE INVENTION

A lens array, an image sensor, and an information processor which comprises this image sensor of this invention and an information processing system which comprises this image sensor of this invention are explained in detail below.

The image sensor of this invention is composed by an opto-electronic conversion device which receives light, a lighting device, and a lens array in which plural graded index lenses are arranged in line. Each graded index lens forms the image of the reflected light from a document on said opto-electronic conversion device.

The lens array of this invention is the one in which cylindrical graded index lenses of the radius $r_0$ are arranged in line.

Both glass and plastic graded index lens are good. A lens made of plastic is especially desirable because it is cheap and easy to process.

The radius $r_0$ of cylindrical graded index lens is desired to be 0.1 mm or more, and to be 1 mm or less. When $r_0$ is smaller than 0.1 mm, it is likely to be difficult to make a lens array. The lens array in which $r_0$ is larger than 1 mm tends not to be practical because the length $Z_0$ of the lens array becomes too large.

The graded index lens used in this invention has a refractive index profile that continuously decreases from the center toward the periphery. Desirably, the refractive index profile of said lens is the one in which the range of $0.2r_0 \sim 0.7r_0$ can be approximated by $n(r)^2 = n_0^2 \{1-(g \cdot r)^2\}$ at least, wherein, r: the distance from the optical axis; n(r): the refractive index at the distance r from the optical axis; $n_0$: the refractive index at the center; and g: the refractive index profile constant.

The effective radius $r_1$ of the lens used for this invention is $r_1 \leq r_0$. An effective radius means the radius of the transparent part for the light of the wavelength used. The neighborhood of the periphery of the lens used for this invention may be opaque to avoid flaring light and crosstalk light which do not to contribute to image forming.

Furthermore, the aperture angle of the lens used by this invention is desired to be 15 degrees or less to improve the characteristics of the lens array, especially the focus depth characteristics.

The lens array used by this invention can be made by an optional publicly known method using graded index lenses. For example, it can be made by a method in which several graded index lenses are arranged in parallel at a fixed pitch, and are fixed on a board with an adhesive, etc., and are cut to fixed length $Z_0$, and end surfaces of the lenses are polished.

The array pitch of lenses means a distance between the center axes of the lenses located next to each other, and is shown with 2R. R and the radius $r_0$ of the lens in the lens array of this invention satisfy $R \geq r_0 \geq 0.8R$. Desirably, R and the radius $r_0$ of the lens satisfy $R > r_0 \geq 0.8R$. The amount of light of the lens array can be enlarged by satisfying $r_0 \geq 0.8R$. Reading speed can be improved when this lens array is used for the image sensor, even when the lens whose aperture angle is small and whose chromatic aberration is small is used. Furthermore, R becomes $R = r_0$ when lenses are arranged to touch each other perfectly. By satisfying $R > r_0$, crosstalk between lenses is prevented, and the resolution of the lens array can be improved, and it becomes easy to obtain the overlapping degree m in the range of this invention mentioned later, and the total number of lenses used for the lens array can be reduced. Therefore, it is economical.

The overlapping degree m defined by $m = X_0 / 2R$ of the lens array of this invention satisfies $1.05 \leq m \leq 1.2$ (wherein, r: a distance from the optical axis; n(r): the refractive index at the distance r from the optical axis; $n_0$: the refractive index at the center; g: the refractive index profile constant; $X_0$: the radius of the field of view ($X_0 = -r_1 \cos(Z_0 \pi / P)$), $r_1$: the effective radius of the graded index lenses; $Z_0$: the length of the graded index lenses; and P: the period length of the graded index lenses ($P = 2\pi/g$)). Desirably, m satisfies $1.1 \leq m \leq 1.2$.

The amount of light at the image forming surface of the lens array is enlarged and the variation in the amount of light can be reduced by moving the overlapping degree m to the above-mentioned range. Furthermore, the image sensor in which reading speed is high can be obtained by using the lens array for the image sensor, even when the lenses in which aperture angle is small and chromatic aberration is small are used, because the amount of light reaching the light receiving sensor is large. Furthermore, even if the lens with chromatic aberration is used, the image sensor whose resolution is high can be obtained.

It is desirable that the interval Lm (air layer conversion) between the end surface of the graded index lens and a document satisfies $0.95 \cdot L_0 \leq Lm \leq 1.05 \cdot L_0$, and that the interval Ls (air layer conversion) between the end surface of the lens and the sensor satisfies $0.95 \cdot L_0 \leq Ls \leq 1.05 \cdot L_0$ in the image sensor of this invention (wherein, $L_0 = -(1/n_0 g) \cdot \tan(Z_0 \pi / P)$).

The lens satisfying such a condition forms an image of the reflection light from a document on the sensor under the conditions close to the ideal conditions of the variation in the amount of light and resolution. Therefore, the image sensor in which the variation in the amount of light is smaller and in which the resolution is higher can be obtained. Resolution tends to decrease and the variation in the amount of light tends to increase when Lm and Ls are out of the above range, because deviation from the erect equal size image increases.

Figure 1:
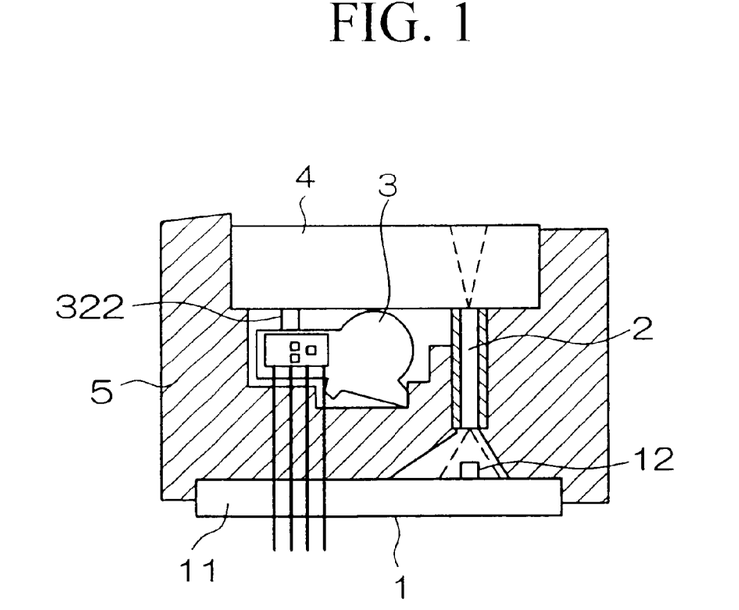
FIG. 1 is a cross section of the image sensor of this invention.
Figure 2:
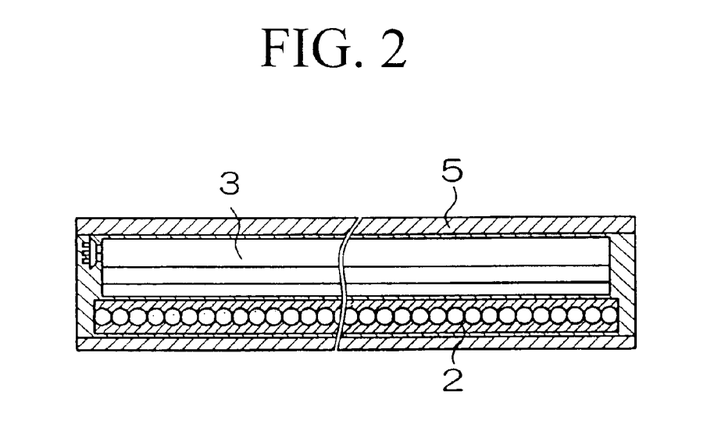
FIG. 2 is a top view of the image sensor of this invention.

The image sensor of this invention is composed of a sensor array 1, a lens array 2, a lighting device 3, a cover glass 4 and a frame 5 as shown in the cross section of FIG. 1 and the top view of FIG. 2. In the sensor array 1, the sensor ICs 12 comprising line-shaped opto-electronic conversion devices are arranged in lines precisely on the sensor board 11. The number of the sensor ICs 12 corresponds to the length of a document read by the sensor array. The cover glass 4 consists of optically transparent components. The frame 5 establishes those positions and holds them.

Furthermore, 322 is a warp correction pin. In the manufacture of the image sensor, the warp correction pin 322 of the lighting device 3 and the top surface of the lens array 2 are first pressed against the cover glass 4. In this state, the cover glass 4 is bonded to the inner side surface of set frame 5 in the condition that the top surface of the lens array 2, the frame 5 and the lighting device 3 are on the same plane approximately, and that the lighting device 3 and the lens array 2 are put between right and left inner surfaces of the frame 5. By this method, the lighting device 3 and the lens array 2 can be decided these position precisely and fixed without warp. Therefore, light can be irradiated properly at the desired lighting position. Therefore, the reflection light from a document can form the image in focus over the entire length of the lens array 2.

The lighting device 3 used with the image sensor of this invention is for lighting a document. An incandescent lamp, a cold-cathode tube, LED, etc. are used as the illuminant of the lighting device 3. This illuminant may be combined with a filter element for the purpose of cutting the light of the specific wavelength. An LED is desirably used as the illuminant of the lighting device 3 because it is easy to use the light of a specific wavelength. Furthermore, composing a color image sensor of several kinds of LEDs with wavelengths which are different from each other is more desirable. It is especially desirable that the illuminant is composed by plural LEDs with wavelengths of three colors that are equivalent to blue, green, and red, and that are different from each other. When the sensor is used as a color image sensor, it is desirable to make the peak luminous wavelength 450~480 nm (blue), 510~560 nm (green), 600~660 nm (red), respectively, for the purpose of improving color reproduction. In the lighting device 3, the illuminant and the light guide are arranged so that light from the illuminant enters the light guide, and so that light going out of the light guide lights a document.

Figure 3:
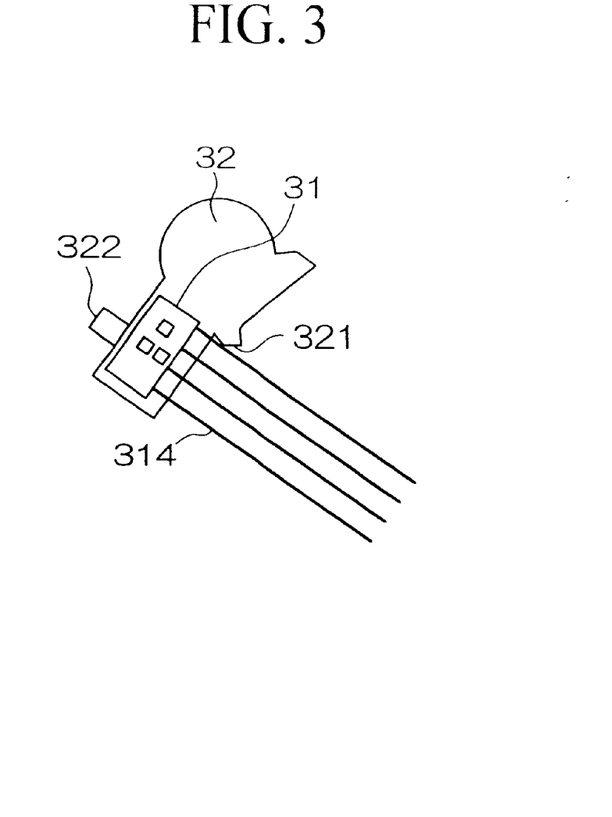
FIG. 3 is a side view of the lighting device used by this invention.
Figure 4:
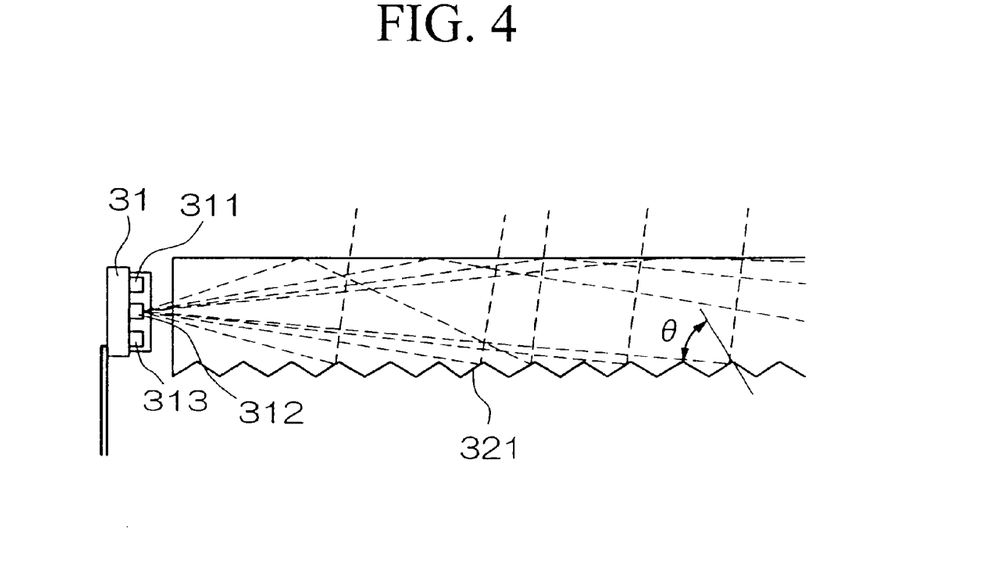
FIG. 4 is detailed figure of the lighting device used by this invention.

The side view of the lighting device is shown in FIG. 3, and the detail figure of the lighting device is shown in FIG. 4. For example, the lighting device 3 is composed by the RGB 3-color LED illuminant 31 and the light guide 32 which consists of part having excellent optical transparency such as an acrylic resin. The RGB 3-color LED illuminant 31 is the part that LED elements of 3 colors including red (R) LED element 311, green (G) LED element 312 and blue (B) LED element 313 as illuminants are packed in one package.

The RGB 3-color LED illuminant 31 is arranged so that the light from one end or both ends along its length enters the light guide 32. Furthermore, the light entering the light guide 32 is transmitted in the light guide 32 while repeating total reflection on the interface between the light guide 32 and the air. And, the lead line 314 extends from the RGB 3-color LED illuminant 31.

Furthermore, as shown in the detail figure of the lighting device of FIG. 4, in the light guide 32, the inner saw tooth part 321 having minute saw teeth is formed continuously along the length of the light guide 32. Then, only the light entering the inner saw tooth part 321 among the light transmitted in the light guide 32 is different from the light entering the other surfaces, and is reflected and changes direction toward a document. Then, on the next interface between the light guide 32 and the air, the light does not satisfy the condition of the total reflection angle, and goes out of the light guide 32 pointing to the desired direction.

Figure 5:
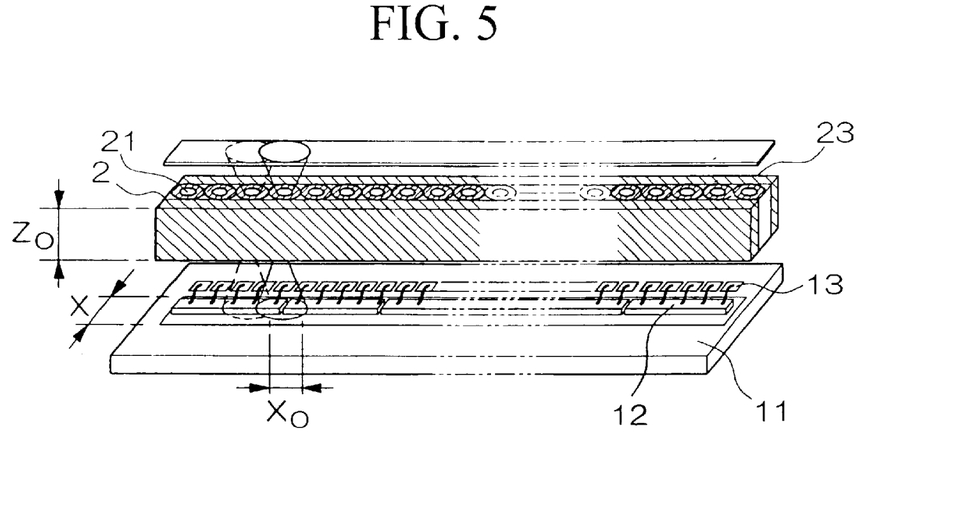
FIG. 5 is detailed figure of the lens array used by this invention.

Next, the detail configuration of the lens array 2 used in this embodiment is shown in FIG. 5. The lens array 2 of this embodiment is composed by the lenses 21 having the refractive index profile. In the lens array 2, plural cylindrical lenses 21 are arranged in line, and are put between two sheets of the side boards 23. The cylindrical lens 21 has functions as a lens by making the refractive index different gradually from the center of the lens toward the periphery.

The sensor board 11 is the glass-epoxy board made of fiberglass impregnated with epoxy resin, etc. or the ceramics board on which electric wiring is formed. The sensor IC 12 is the opto-electronic conversion device which converts light into electricity and which is of the CCD or CMOS type. The plural sensor ICs 12 are glued by adhesive on the sensor board 11 in line precisely. Furthermore, the sensor IC 12 and the sensor board 11 are connected to each other electrically through the gold wire 13.

The operation of the image sensor of this invention is explained below. The lighting device 3 lights a document which is pressed on the cover glass 4 and which is supported by the cover glass 4 from the oblique direction, as changing the lights of three colors including R, Q and B in turn. The lens array 2 forms the image of the reflected light having the color information of three colors including R, G, and B from a document on the sensor IC 12. The sensor IC 12 converts the light having the color information of three colors including R, G, and B into electrical signals, and transmits the electrical signals to a system (not shown in the figure). The system processes the electrical signals corresponding to three colors including R, G, and B, and reproduces a color image.

Because the variation in the amount of light is small, the image sensor of this invention can read an image uniformly. Furthermore, because apparent chromatic aberration is small, the image sensor can be a color image sensor of high resolution. Furthermore, because the amount of light is high, it is possible to make the speed of reading quickly.

Next, the information processor of this invention is explained. The information processor of this invention comprises the image sensor of this invention and a processing means which processes the image information inputted from said image sensor.

Figure 6:
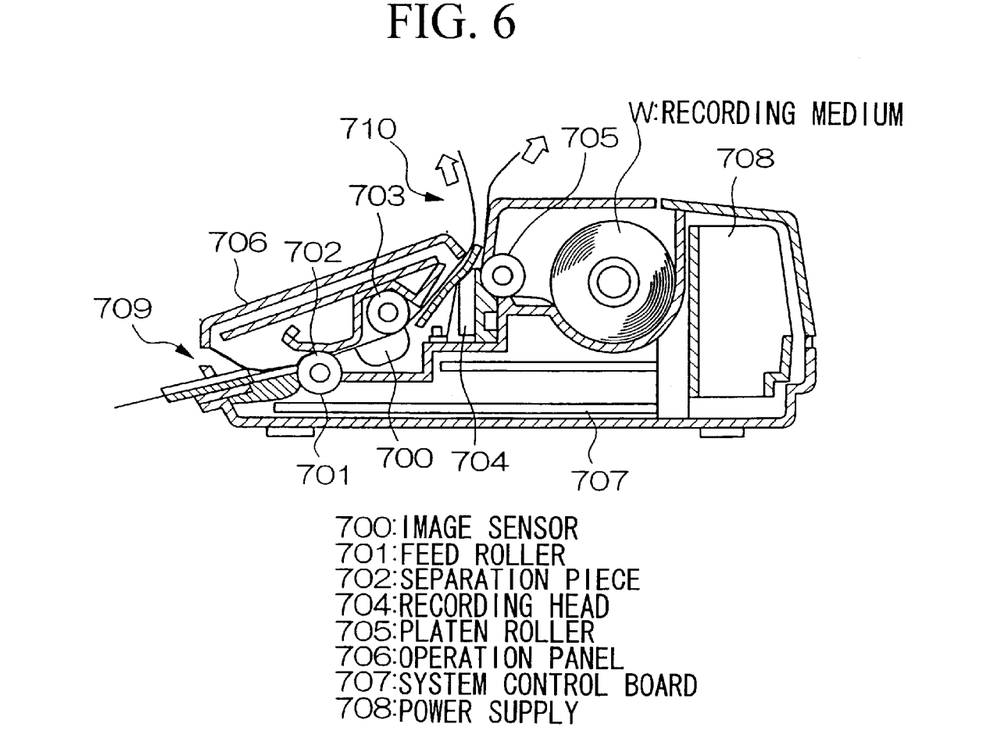
FIG. 6 is a cross section of the information processor of this invention.

The example of the information processor (for example, a facsimile machine) comprising the image sensor of this invention is shown in FIG. 6. In FIG. 6, 700 is the image sensor, 701 is the feed roller to feed a document to the reading position, 702 is the separation piece to separate documents to a one-by-one sheet securely. 703 is the sending roller which is set at the reading position of the image sensor 700 to regulate the position of the surface of a document read by the image sensor 700, and to be used as the document sending means to send a document. Said document sending means is desirable as a means to change relative position between the image sensor 700 and the document because it is simple. It is possible that a means to move the image sensor is used instead of the document sending means. Furthermore, it is possible to use both means together. W shown in figure is the recording medium of the form of a rolled paper. The image information read by the image sensor 700, or transmitted from the outside in the case of the facsimile device and so on is formed here. 704 is the recording head used as the image forming means and various heads such as a thermal head, a bubble jet recording head, etc. can be used for this recording head 704. Furthermore, both the serial type head and the line type head can be used for this recording head 704. 705 is the platen roller which sends a recording medium to the recording position by the recording head 704 and which regulates the position of the surface of the recording medium recorded by the recording head 704. 706 is the operation panel to receive input of operation including indicating parts, etc., arranged therein. 707 is the system control board on which the control part controlling each section, the driving circuit for the opto-electronic conversion device, the processing part of the image information, the transmitting part and the receiving part, and etc., arc put. 708 is the power supply for the device.

This device is controlled by a microcomputer (control means) on the system control circuit board 707. Furthermore, the microcomputer controls said image sensor 700. In other words, the microcomputer controls the lighting of the lighting device 3 and the driving of the sensor array 1.

The processing to record the image signal read by the image sensor 700 in the recording medium W, or the image processing to output the image signal outside is performed by the signal processing circuit (image processing means) on the system control circuit board 707.

Figure 7:
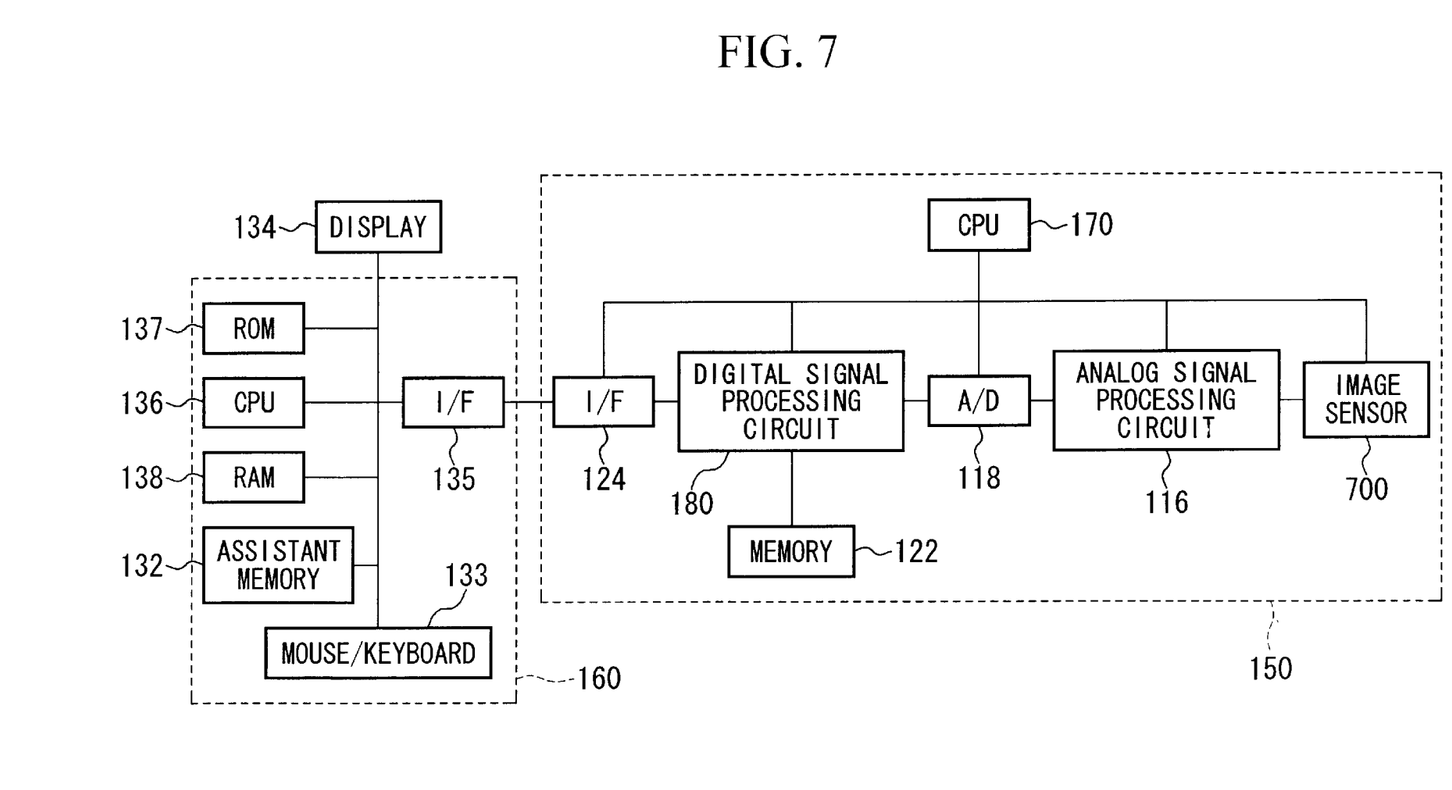
FIG. 7 is a functional block diagram of the information processor of this invention and the computer.

One example of the information processing system which provides the information processor comprising the image sensor 700 is shown in FIG. 7. This information processing system is a system in which the image reading device 150 including the image sensor 700 is connected to a personal computer 160. The image information read by the image reading device 150 is sent to the personal computer 160. Or, the image information is sent in a network furthermore.

In FIG. 7, 170 is the CPU as the first control means controlling the whole of the image reading device 150. Furthermore, 700 is the image sensor as the reading unit composed by said illuminant and CCD line sensor and so on to convert the image of a document to an image signal. Furthermore, 116 is the analog signal processing circuit to give analog processing such as gain control to the analog image signal outputted from the image sensor 700.

Furthermore, 118 is the A/D converter to convert the output of the analog signal processing circuit 116 to the digital signal. Furthermore, 180 is the digital signal processing circuit to give the image processing such as shading compensation processing, γ converting processing and magnification converting processing to the output data of the A/D converter 118 by using the memory 122. Furthermore, 124 is the interface (I/F) which outputs the digital image data given image processing by the digital signal processing circuit 180 outside.

For example, the interface 124 follows the standard adopted for the personal computer such as SCSI or Bi-Centronics. The interface 124 is connected to the personal computer 160.

The image processing means is composed by the analog signal processing circuit 116, the A/D converter 118, the digital signal processing circuit 180, and the memory 122.

The personal computer 160 as the second control means is equipped with the magneto-optical disk drive, the hard disk drive, the floppy disk drive, etc., as the outside memory apparatus or the assistant memory apparatus 132.

134 is a display to indicate operations in the personal computer 160, and 133 is the mouse/keyboard to input commands, etc.

Furthermore, 135 is the interface to administer transmitting and receiving of data, commands and the condition information of the image reading device between the personal computer and the image reading device.

The reading directions toward the image reading device can be inputted into the personal computer 160 by the mouse/keyboard.

When the reading directions are inputted, the CPU 170 transmits the reading command to the image reading device through the interface 135. Furthermore, the personal computer controls the image reading device in accordance with the control program stored in the ROM 137. Furthermore, this control program may be the one which is stored in the memory medium built in the assistant memory device 132, and which is read by RAM 138 in the personal computer, and which is executed by CPU 136.

The information processor of this invention becomes more useful by being used in such an information processing system.

The image sensor of this invention is explained by using the following example. Furthermore, the measurement of the lens performance (MTF) in the example of this invention and the comparative example was performed by the following method.

Figure 8:
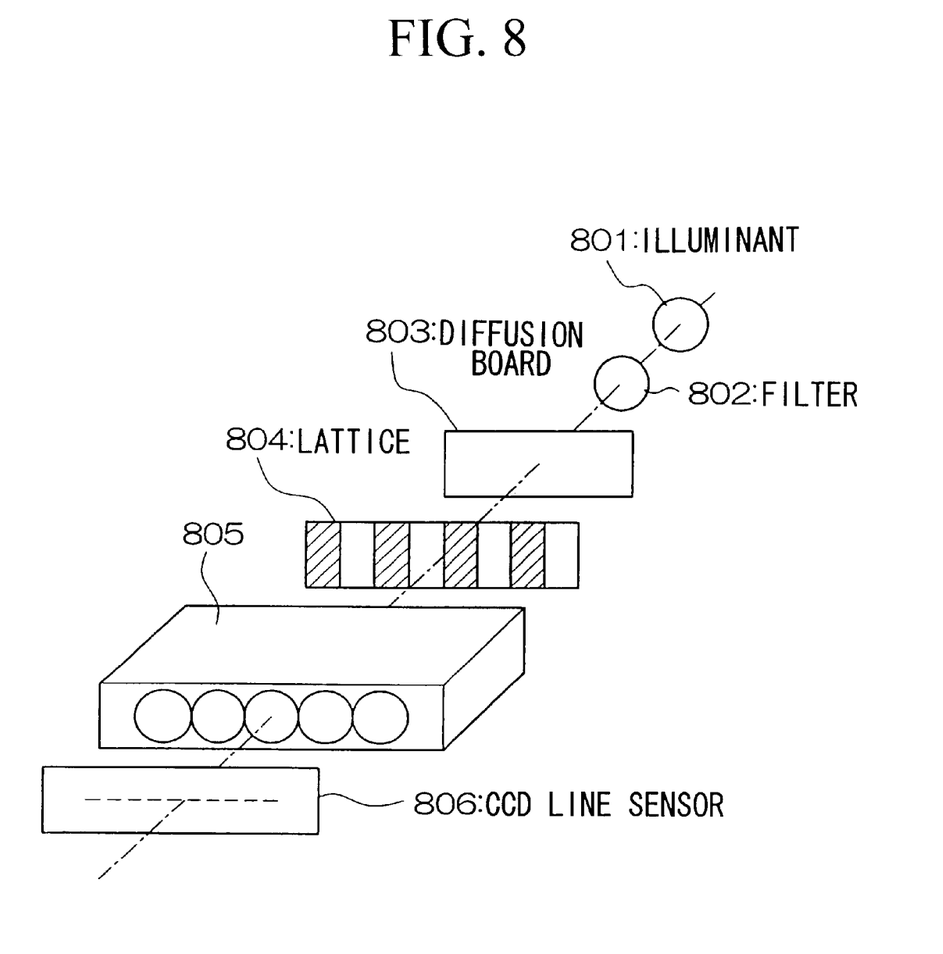
FIG. 8 is a figure which shows the outline of the resolution (MTF) measuring device of lenses.

MTF, which indicates the resolution of a lens, was measured by the following method. First, the standard rectangle lattice 804 which has some spatial frequency (line pair/mm, Lp/mm), the lens array 805, the illuminant 801, the filter 802, and the diffusion board 803 were arranged as shown in FIG. 8. Next, the lattice image was read by the CCD line sensor 806 put on the image forming surface, and the maximum value ($i_{max}$) and the minimum value ($i_{MIN}$) of the amount of light were measured, and MTF was calculated by the following formula.

$$MTF(\%)=(i_{MAX}-i_{MIN})/(i_{MAX}+i_{MIN})\times 100$$

Spatial frequency is the number which indicates how many line pairs, namely sets of the combination of the white line and the black line shown in the lattice 804 in FIG. 8 are put in a width of 1 mm.

First, the example of this invention is explained. The plastic lenses in which the radius $r_0$ is 0.297 mm, the effective radius $r_1$ is 0.250, the refractive index at the center is 1.497, the refractive index profile constant g=0.486 (values are at 525 nm of the wavelength of light) were arranged in one line under the condition that the lenses were in contact with one another and that the optical axis of the lenses were parallel. Then, these plastic lenses were put between two sheets of black color bakelite boards, and were adhered with the epoxy resin adhesive dispersed carbon black. Then, one line of the lens array of the array pitch 2R=0.597 mm, and the length of the lens $Z_0$=8.0 mm was made by cutting and polishing the end face of the lens by a diamond edge. Furthermore, adhesive was impregnated between the lenses at the time of the adhesion, and each lens was isolated by the adhesive because the lenses were pressed with a small pressure in the direction in which lenses were adhered together at the time of the adhesion. The conjugate length (TC) at which MTF at 470, 525, and 630nm of this lens array became maximum was 14.7, 15.0, and 15.4 mm, respectively. The overlapping degree m at 525 nm of this lens array was 1.15, and $L_0$ was 3.5 mm. MTF (12Lp/mm) and the variation in the amount of light at 470, 525, and 630 nm at TC=15.0 mm of this lens array were measured. The measured value of MTF was 55, 77, and 55%, and the measured value of the variation in the amount of light was 12, 8, and 18%, respectively.

The image sensor was made by putting the lens array in the color image sensor under the condition that the interval Lm between the end surface and a document (air layer conversion) was 3.5 mm and that the interval Ls between the end surface and the sensor (air layer conversion) was 3.5 mm. And a color image was transmitted by u sing this image sensor. As a result, the transmission image including little blurring due to the chromatic aberration was obtained.

Next, the comparative example is explained. The comparative example was the same as said example of this invention except that the length of the lens $Z_0$ was 7.6 mm. TC at which MTF at 470, 525, and 630 nm of this lens array became maximum was 17.2, 17.8, and 18.4 mm, respectively. The overlapping degree m at 525 nm of this lens array was 1.55, and $L_0$ was 3.5 mm. MTF (12Lp/mm) and the variation in the amount of light at 470, 525, and 630 nm at TC=15.0 mm of this lens array were measured. The measured value of MTF was 40, 65, and 35%, and the measured value of the variation in the amount of light was 7, 9, and 8%, respectively. Furthermore, the amount of light of the lens array was about 80% of said example of this invention.

The image sensor was made by putting the lens array in the color image sensor under the conditions in which the interval Lm between the end surface and a document (air layer conversion) was 5.1 mm and that the interval Ls between the end surface and the sensor (air layer conversion) was 5.1 mm. Furthermore a image was transmitted by using this image sensor. As a result, the transmission image including blurring due to the chromatic aberration was obtained. The maximum reading speed of this image sensor was 20% below the image sensor of said example of this invention.

Industrial Applicability

The variation in the amount of light of the lens array of the image sensor of this invention is small, and the amount of light thereof is large, and the apparent chromatic aberration thereof is small. Therefore, reading with little blurring due to chromatic aberration, vivid high resolution, and rare variation in the amount of light can be realized.

Furthermore, the information processor and the information processing system of this invention can process the high quality image read by the image sensor.

What is claimed is:

1. A lens array comprises cylindrical graded index lenses of radius $r_0$ wherein the refractive index continuously decreases from the center of the lenses toward the periphery, said cylindrical graded index lenses are arranged in one line or plural lines with array pitch 2R, if R is $R \geq r_0 \geq 0.8R$ and if the refractive index profile of each graded index lens is approximated by $n(r)^2=n_0^2\{1-(g \cdot r)^2\}$, the overlapping degree m defined by m=$X_0$/2R satisfies $1.05 \leq m \leq 1.2$, wherein said r is the distance from the optical axis, n(r) is refractive index at the distance r from the optical axis, $n_0$ is the refractive index at the center, g is the refractive index profile constant, $X_0$ is the radius of the field of view where $X_0$=−r1 cos($Z_0\pi$/P), $r_1$ is the effective radius of the graded index lenses, $Z_0$ is the length of the graded index lenses, and P is the period length of the graded index lenses namely P=$2\pi$/g.

2. The lens array according to claim 1 wherein the aperture angle of said graded index lens is 15 degrees or less.

3. The lens array according to claim 1 wherein R is R>$r_0 \geq$0.8R.

4. The lens array according to claim 1 wherein the overlapping degree m is $1.1 \leq m \geq 1.2$.

5. The lens array according to claim 1 wherein said graded index lens is made of plastic.

6. The lens array according to claim 1 wherein said graded index lens is made of glass.

7. An image sensor comprises a lighting device which lights a document, the lens array which makes reflected light from a document to form an image according to claim 1, and the opto-electronic conversion device which receives the light of the image formed by said graded index lens.

8. The image sensor according to claim 7 which comprises the lens array wherein an interval Lm between the end surface of one side of said graded index lens and the document satisfies $0.95 \cdot L_0 \leq Lm \leq 1.05 \cdot L_0$ with the air layer conversion, and wherein an interval Ls between the end surface of the other side of said graded index lens and the sensor satisfies $0.95 \cdot L_0 \leq Ls \leq 1.05 \cdot L_0$ with the air layer conversion, wherein said $L_0$ is $L_0 = -1/n_0 g) \cdot \tan(Z_0 \pi/P)$.

9. The image sensor according to claim 7 wherein the illuminant of said lighting device is an LED.

10. The image sensor according to claim 8 wherein the illuminant of said lighting device is an LED.

11. The image sensor according to claim 7 wherein the illuminant of said lighting device comprises plural LEDs emitting wavelengths which are different from each other.

12. The image sensor according to claim 8 wherein the illuminant of said lighting device comprises plural LEDs emitting wavelengths which are different from each other.

13. The image sensor according to claim 7 wherein the illuminant of said lighting device comprises plural LEDs emitting wavelengths of three colors that are equivalent to blue, green, and red, and that are different from each other.

14. The image sensor according to claim 8 wherein the illuminant of said lighting device comprises plural LEDs emitting wavelengths of three colors that are equivalent to blue, green, and red, and that are different from each other.

15. An information processor comprises the image sensor according to claim 7 and a processing means which processes the image information inputted from said image sensor.

16. An information processor comprises the image sensor according to any one of claims 8 to 14 and a processing means which processes the image information inputted from said image sensor.

17. An information processor comprises the image sensor according to claim 7, means which changes the relative position between a document and the image sensor, an image forming means which forms an image from the image information read with said image sensor, and a control means which controls from input of a document to output.

18. An information processor comprises the image sensor according to any one of claims 8 to 14, means which changes the relative position between a document and the image sensor, an image forming means which forms an image from the image information read with said image sensor, and a control means which controls from input of a document to output.

19. An information processor comprises the image sensor according to claim 7, an analog signal processing means which processes an analog signal from said image sensor, a converting means which converts said analog signal into a digital signal, a digital signal processing means which processes said digital signal from said converting means, and an interface means which connects with an outside apparatus.

20. An information processor comprises the image sensor according to any one of claims 8 to 14, an analog signal processing means which processes an analog signal from said image sensor, a converting means which converts said analog signal into a digital signal, a digital signal processing means which processes said digital signal from said converting means, and an interface means which connects with an outside apparatus.

21. An information processing system comprises the information processor according to claim 19 and a computer connected with said information processor, wherein said interface means built in said information processor and a second interface means built in said computer are connected to each other, and wherein a digital signal is transmitted and received through said interface means and said second interface means.

22. An information processing system which comprises the information processor according to claim 20 and a computer connected with said information processor, wherein said interface means built in said information processor and a second interface means built in said computer are connected to each other, and wherein a digital signal is transmitted and received through said interface means and said second interface means.

* * * * *